United States Patent
Hübener

(10) Patent No.: US 7,316,555 B2
(45) Date of Patent: Jan. 8, 2008

(54) DEVICE FOR PRODUCING DOUGH PRODUCTS

(76) Inventor: Paul Hübener, Opladenerstrasse 34, D-42799 Leichlingen (DE)

(*) Notice: Subject to any disclaimer, the term of this patent is extended or adjusted under 35 U.S.C. 154(b) by 16 days.

(21) Appl. No.: 11/286,272

(22) Filed: Nov. 23, 2005

(65) Prior Publication Data

US 2006/0123997 A1    Jun. 15, 2006

(30) Foreign Application Priority Data

Nov. 23, 2004  (DE) .................. 20 2004 018 188

(51) Int. Cl.
*A23P 1/00*    (2006.01)
(52) U.S. Cl. .................. 425/300; 425/318; 426/503
(58) Field of Classification Search ............ 425/298, 425/300, 318; 426/503
See application file for complete search history.

(56) References Cited

U.S. PATENT DOCUMENTS

| | | | | |
|---|---|---|---|---|
| 912,006 | A | * | 2/1909 | Tatosian ................ 425/298 |
| 2,780,181 | A | * | 2/1957 | Roman et al. ........... 425/299 |
| 5,255,595 | A | * | 10/1993 | Higgins ................. 99/378 |
| 6,194,017 | B1 | * | 2/2001 | Woodward et al. ....... 426/503 |

FOREIGN PATENT DOCUMENTS

EP        676141 A1 * 10/1995

* cited by examiner

*Primary Examiner*—Robert B. Davis
*Assistant Examiner*—Marissa W. Chaet
(74) *Attorney, Agent, or Firm*—Andrew Wilford

(57) ABSTRACT

A manually operable device for making dough pockets can have a respective frame formed in shells hinged together so that the faces of the frame members can bond dough pockets together around their peripheries and cut off excess dough from the dough pockets. Ribs can be provided to subdivide the frames and the surfaces of the ribs and frames can be toothed where the frames squeeze the dough layers together.

15 Claims, 3 Drawing Sheets

DEVICE FOR PRODUCING DOUGH PRODUCTS

FIELD OF THE INVENTION

My present invention relates to a hand-operated device for producing dough pockets.

BACKGROUND OF THE INVENTION

Dough pockets are used in a wide variety of forms in the food industry, usually as a vehicle for a variety of fillings which can be received in the dough pocket and are sandwiched and incorporated between the layers of dough.

Such dough pockets can be formed automatically for high speed commercial manufacture, in which case the dough pockets can be packaged for sale or distribution They can be made manually as well for domestic or less wide-spread consumption.

OBJECTS OF THE INVENTION

It is the principal object of the present invention to provide a device which can be manually operated and which can make at least one dough pocket.

More specifically, an object of the invention is to provide a hand operated device for simplifying the production of a dough pocket and especially to more reliably seal a dough pocket and cut away a dough pocket from surrounding portions of the dough layers.

A further object of the invention is to provide a device for the purposes described which will be free from disadvantages arising in earlier techniques for making dough products.

SUMMARY OF THE INVENTION

These objects and others which will become more readily apparent hereinafter are attained, in accordance with the invention, in a hand operated device for making at least one dough pocket which comprises:
  a first frame;
  a second frame connected to the first frame by at least one hinge whereby the frames are swingable relative to one another between a closed position in which the frames are juxtaposed and an open position whereby dough layers and a filler for a dough pocket can be inserted between the frames; and
  a first squeezing frame profile section on the first frame at a face thereof along an edge of the pocket and a second squeezing frame profile section on the second frame at a face thereof juxtaposed with the first squeezing frame profile section in the closed position for squeezing edges of dough layers together along the pocket, the squeezing frame profile sections defining opposing separating edges subdividing the pocket from the layers.

A hand operated device for producing dough pockets in accordance with the invention comprises first and second frames which are aligned along edges thereof at their juxtaposed faces and can thus be closed with their faces in juxtaposed relationship. The first frame and second frame have respective first and second squeezing profiles by means of which the layers around the periphery of the pocket are pressed together to seal them and which, in the closed position, form opposing separating edges capable of subdividing the pockets from the layers in which the pocket is formed.

The frame can have a closed rectangular cross section, although other shapes are possible including especially a round, triangular, polygonal or even a generally nonuniform shape. The dough pocket can be, for example, a mouth size or bite size pocket or a larger pocket and especially can be a filled baked pocket and particularly a pocket formed in one layer of dough which can be placed for example on the face of the first frame, filled with a filling, covered with a cover layer of a dough and separated by closing the second frame on the first. The first and second frames can be dimensioned to conform to one or more pockets which are formed therein and thus a grid like frame arrangement can be provided in which a multiplicity of dough pockets can be simultaneously formed.

In a preferred embodiment, around the perimeter of the dough pocket the first and second squeezing profiles can define a gap which has a width corresponding substantially to twice the thickness of the dough layer in a first region (inner region) around the filling. Outwardly of this inner or first region, in a second region, the gap width can taper to substantially zero at a third region, outwardly of the second, at which the separating edges are provided. At this region the pocket is completely separated from the layers whereas in the tapered second region, a reliable seal is provided between the dough layers. In a first variant, the first and second squeezing profiles at the juxtaposed faces of the frames are of identical shape. In a second variant, the first and second squeezing profiles are of different shapes. For example in the second variant, the first squeezing profiles can have surfaces which lie in a plane.

The width of the first region can be between one-half and four times the thickness of a dough layer and preferably between one and two times the dough layer thickness. Especially in the first region, this ensures that an adhesion region for the dough layers will be provided.

According to a feature of the invention, the first frame and/or the second frame can be reversibly detachable or connectable with first and second shells forming housings for the first and second frames respectively. The first frame can form a unit with the first shell. Alternatively, the first frame can be detachable and replaceable in the first shell. The same applies to the second frame and the second shell.

The first frame and second frame as well as the second frame and second shell can be interchangeable with one another. For example the first and second frames can form a unit which can be inserted into the first and second shells which in turn can form a unit. Thus the first and second frames can be replaced as a unit in the first and second shells or the first and second shells can be replaced as a unit receiving the first and second frames.

For connecting a frame with a shell, in accordance with the invention, the first and/or the second frame and the first and/or the second shell can have at least one detent or locking element for releasably interconnecting a shell with a frame. Preferably the locking or detent element can include a spring lug or tongue which can be provided on the shell or surface and can engage in a hole, slot or window of the other element.

The locking connection between the two can be in the form of a bayonet connection. The hinge elements can be preferably provided directly between the first and second shells although they can also be provided along a side of the first and/or second frame.

In a first variant the hinge element can be provided between the two shells. The frames can then be reversibly connectable with the first and second shells. In a second variant, the first and second shells as well as the first and second frames can be connected with a hinge element. In a third variant one side of the hinge is connected with one of the frames and the other side of the hinge with the other frame while the shells are then connected to the frames.

Particularly simple manipulation is ensured when the hinge is repeatedly separable. In this manner the first frame and the second frame can be separated from one another by separating the two at the hinge. A hinge pin or pintle can then be withdrawn to permit separation of the hinge. Alternatively, a hook type hinge can be provided which, in one angular position about a pin or stud allows separation of the two parts of the hinge. Especially to improve the ability to fit the pocket, the squeezing profile around the fist and/or second frame can have an at least partly closed face. The frame of this profile is preferably closed so that the frame together with this face forms a shell. The face of the profile can also be partly interrupted or broken. In an especially preferred configuration, the frame face has the configuration of a grid and forms a receiving tag surface for a dough pocket In another preferred feature of the invention, the end face of the frame surrounds a pocket for each pocket and preferably along the parting edges previously described, has a toothed configuration. The toothed configuration may form a wave pattern and the teeth on the juxtaposed faces of the frame may interdigitate with a tooth on one end face engaging in a space between teeth of the other face. The toothed arrangement increases between the dough layers, provides an attractive pattern in the perimeter of the pocket and facilitates sealing.

The first and second frames can be provided with at least one rib which can be removable and/or movable and which can be inserted into the frame to subdivide it to form respective dough pouches. The rib can be provided as a profile or section capable of defining part of the perimeter of the respective dough pocket. Advantageously, each rib forms two mirror symmetrical profile sections on either side of a common separating edge preferably can be arranged in the middle of the rib.

In the case of a generally rectangular cross section of the rib a closed frame surface can be provided which can define two squeezing segments on opposite sides of the separating edge. The frame can be divided by means of two rib segments to provide three pockets within a given frame and utilizing an arbitrary number of ribs or segments, practically any desired number of dough pockets can be formed within a basic frame. An advantageous connection between a rib and the remainder of the device is formed by a detent or locking arrangement which enables the rib to be detachably or variably engaged with the respective frame or the shell of the respective frame.

The rib can have on its underside at least one pin which can engage in a corresponding hole in the first or second shell or in the limbs of the respective frame.

Alternatively or in addition, a detent or locking arrangement can be provided in the form of a spring lug on or engageable with the rib or on or engageable with the pin. The spring lug can be used in place of or in addition to the pin and, in an alternative arrangement, the rib can have a hammer head formation which can be engaged in an elongated hole in the frame or shell or a hole with a varying cross section forming a lock with the hammer head. In another configuration a pin at an end of the rib can engage in a fastening hole or the like along the inner periphery of the limb or frame with or in another rib.

It has been found to be advantageous, moreover, to provide on the underside of the device, a slip-limiting element, for example one or more rubber feet. Alternatively, one or more suction cups can be provided. It is also possible to use other means for fixing the device on a support, for example a work table.

The material for the frame or a rib of the frame, the shell or the hinge element can be a plastic, a metal, a metal alloy or wood. Especially the frame can be made from metal while the shell is composed of plastic.

In principle, any optional combination of these materials is possible.

Advantageously, to reduce wear the squeezing profiles of the device or the invention can be made from a different material from that constituting the first and/or second frame. For instance, the squeezing profile may be made of metal or metal alloy while the remainder of the frame is made from a plastic. The squeezing profile itself is preferably replaceable in or on the frame.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
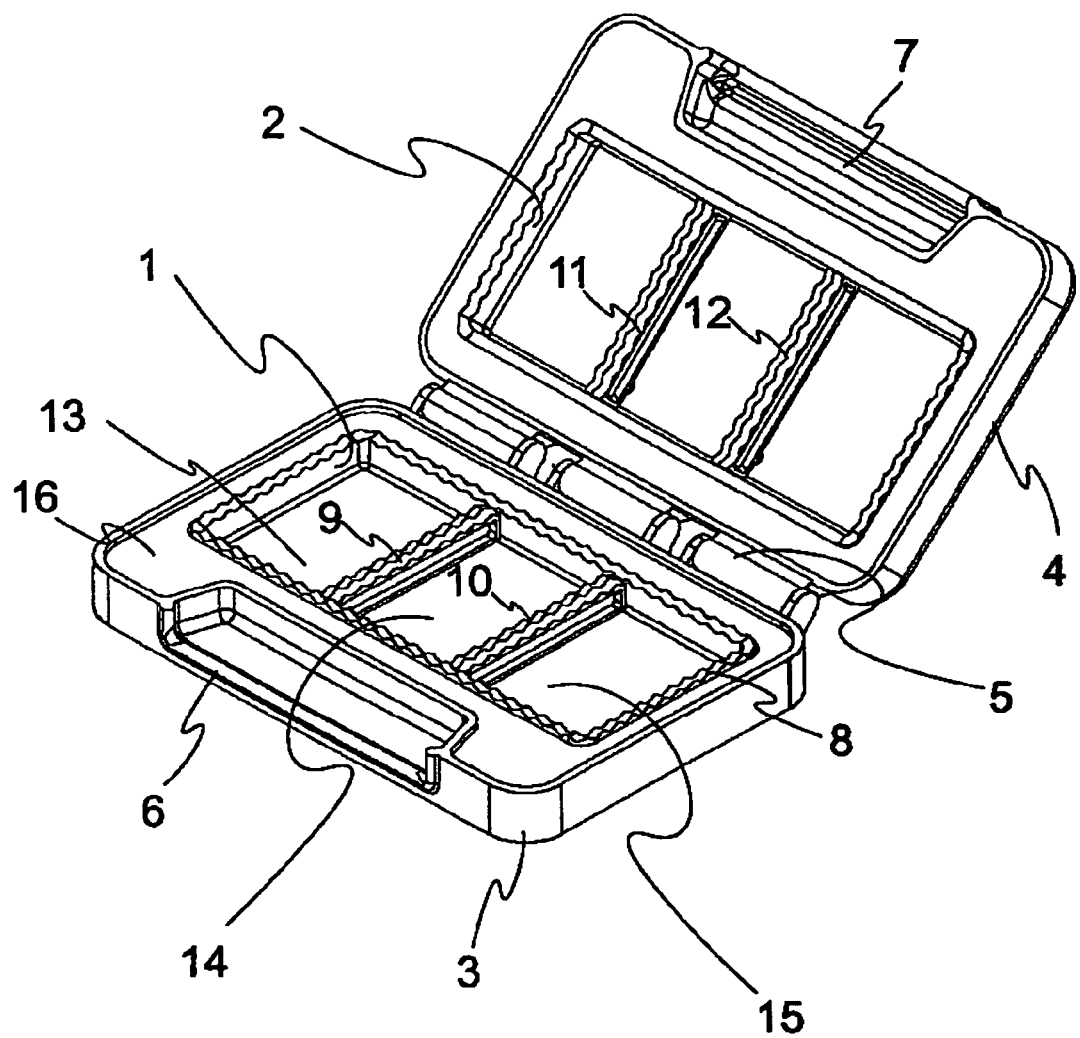
FIG. 1 is a perspective view of a table-top hand-operated device for making dough pockets.

FIG. 1 shows a first embodiment of a table-top or portable device for making dough pockets according to the invention which comprises a first frame 1 and a second frame 2 mounted respectively or formed in a first shell 3 and a second shell 4 forming respectively the lower and upper members of the device.

The first shell 3 and the second shell 4 are connected together by a hinge 5 which is separatable so that the two shells can be separated from one another or interconnected as shown in FIG. 1 to allow the device to swing from the open position shown into a closed position in which the first frames 1 and 2 register with one another, i.e. are juxtaposed with their respective edge faces substantially in contact with one another.

To facilitate opening and closing the device, the first shell 3 is provided with a first grip 6 and the second shell 4 is provided with a second grip 7.

The first frame 1 and the second frame 2 are provided as respective toothed members 8, i.e. with teeth of the frames which interdigitate with one another.

In addition, the lower or first frame 1 has first and second lower ribs on bars 9 and 10 while the second. frame 2 has, aligned therewith, first and second upper ribs or bars 11 and 12 which subdivide the first frame and second frame into respective cavities 13, 14 and 15 in which three dough pockets can be formed simultaneously.

In making the dough pockets, a first dough layer is placed over the lower frame 1 with the device open and in each of the cavities or troughs 13, 14, 15, a respective quantity of a filling is placed on the dough layer. A second dough layer is applied to cover the pockets and the device is then closed. In FIG. 1 neither the dough layers nor the fillings have been shown.

Upon closing of the second shell 4 and second frame 2 onto the dough layers, the dough layers are bonded together around the peripheries of the dough pockets and the dough pockets are completely separated from the dough layers by the pressure of the separating edges of the frames against one another and through the dough pockets. The dough residues are collected in a fourth trough 16 provided outside the first frame 1 and formed in one or both of the shells 3, 4. The dough pockets can then be removed along with the residue and the process repeated.

Figure 2:
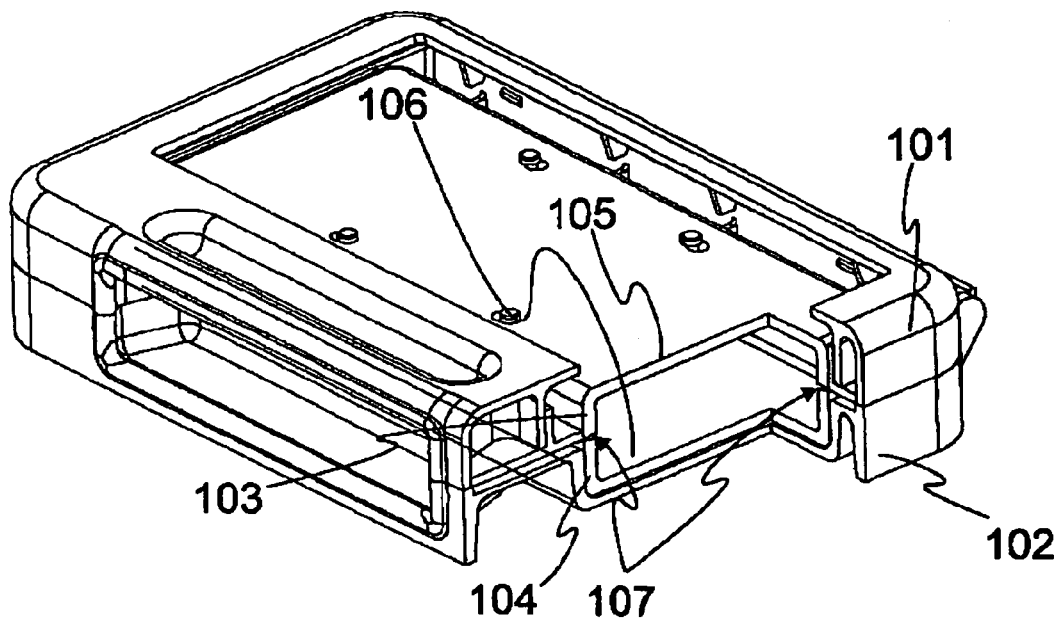
FIG. 2 is a perspective view of a second device, partly broken away.

FIG. 2 shows a second embodiment of the device which corresponds largely with that of FIG. 1. This second embodiment is shown partly broken away. The second embodiment also has a third shell 101 located above a fourth shell 102, a third frame 103 and a fourth frame 104 between which the layers are clamped and which serve to bond the upper layer to the lower layer around the dough pockets and cut the dough pockets from the layers. Here the third frame 103 has a first frame inner surface 105 and the fourth frame 104 an inner surface 106 which are aligned with one another. The frames, their inner surfaces and their respective shells are formed in one piece with one another. The third frame 103 and the fourth frame 104 at their juxtaposed faces in the closed position of the device define a gap 107 in which the layers are squeezed together.

Figure 3:
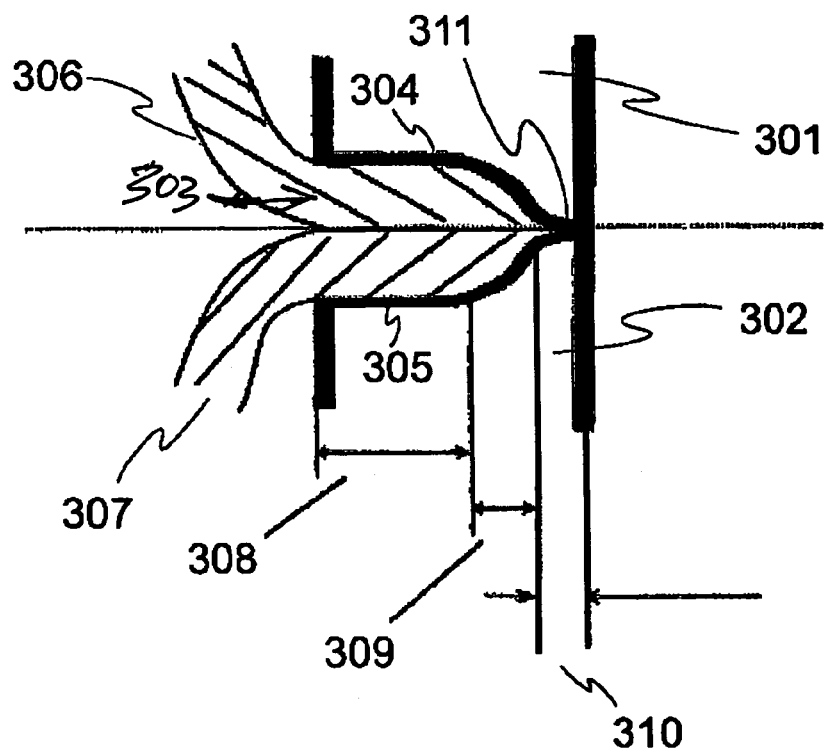
FIG. 3 is a detail section at the gap between the first and second frames of such a device.

FIG. 3 shows a cross section through a gap of this type and the gap of FIG. 3 thus is intended to represent substantially the gap 107 described in connection with FIG. 2.

Between the upper frame 301 and the lower frame 302, therefore, a gap is formed at 303 in which the layers 306 and 307 can be squeezed together. To this end, the upper frame 301 is formed with a profile section 304 and the layer frame 302 is formed with a profile section 305, these profile sections being juxtaposed with one another to define that gap 303 in which the first dough layer 306 and the second dough layer 307 are squeezed together and thereby joined.

The two profile sections 304 and 305 are so configured that the gap 303 will have a first region 308 in which the gap width is about twice the thickness of the dough layers 306, 307 and outwardly of this region, a second region 309 in which the thickness tapers outwardly to approximately zero. At a third region 310 outwardly of the region 309, a separating edge 311 is formed. In this separating edge 311 the dough layers are completely cut off the pockets. In the second region 309, there is a compaction of the margins of the dough forming the pocket while in the first region 308 there is a bonding together of those margins.

Figure 4:
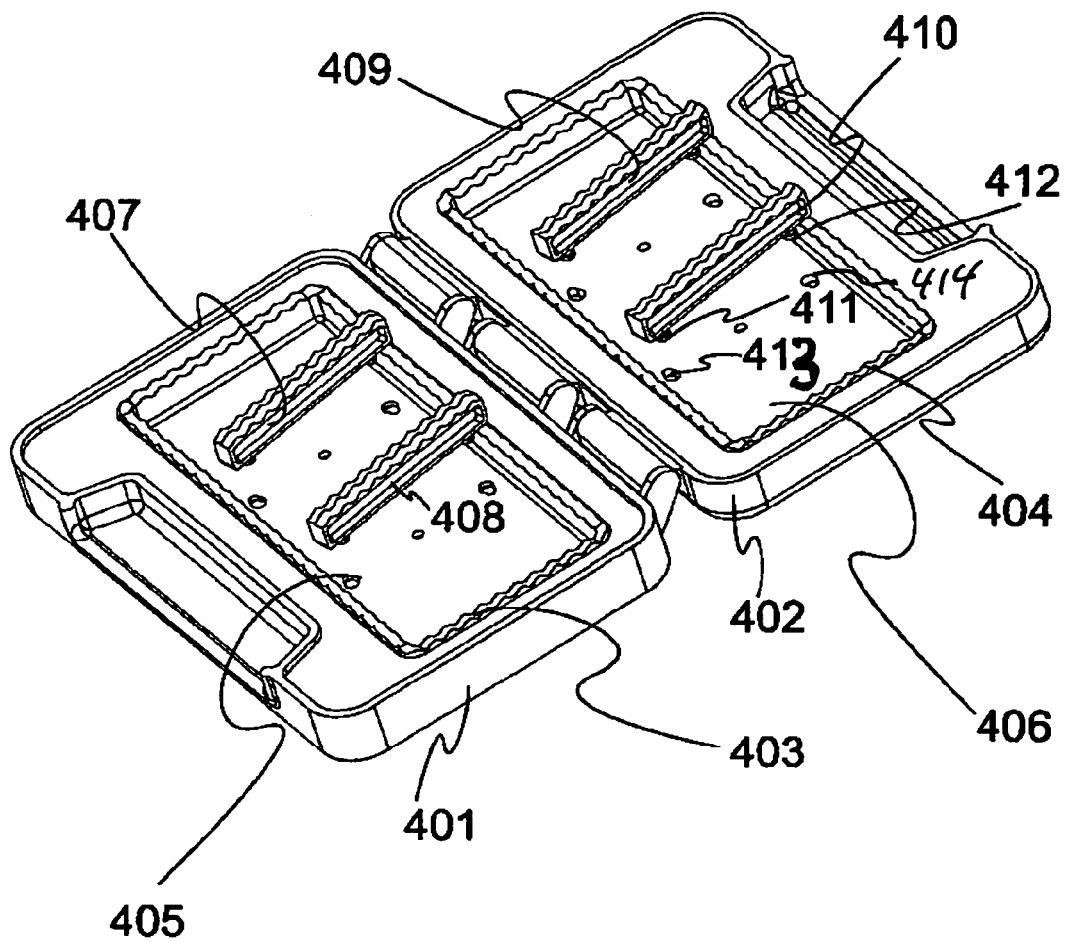
FIG. 4 is a perspective view illustrating a third embodiment.

FIG. 4 shows a third embodiment of the device corresponding substantially to that of FIG. 1. The device here comprises a lower shell 401 and an upper shell 402 respectively receiving the lower frame 403 and upper frame 404. The frames 403 and 404 have inner surfaces 405 and 406. Lower ribs 407 and 408 juxtaposed with upper ribs 409 and 410 subdivide the frames 403 and 404. To affix the ribs 409 and 410 to the inner surface 406 of the upper shell 402, pins 411, 412 are provided which can snap into fastening holes 413 and 414 of the shell.

The framing holes 413 and 414 can be keyhole shaped if desired to enable the pins 411 and 412 to lock into place, the pins 411 and 412 can have hammer head configurations for that purpose. When a locking arrangement of a different configuration is desired one of the holes can have a slot into which the hammer head end of a pin can engage whereupon the rib can be angularly displaced through 90° to lock its pin in the slot and allow another pin of the rib to engage in a hole. Other rib configurations and locking devices can be provided to allow any desired number of pockets to be formed by the frames.

I claim:

1. A hand-operated device for making dough pockets, the device comprising:
    a first frame;
    a second frame;
    a hinge connecting said first frame to said second frame, said frames being swingable relative to one another between a closed position in which said frames are juxtaposed and an open position in which dough layers and a filler for a dough pocket can be inserted between said frames;
    detents on each of said frames;
    respective ribs releasably fittable with said detents and juxtaposed in the closed position and each being mirror symmetrical to opposite sides of a parting edge for cutting said layers; and
    a first squeezing frame profile section on said first frame at a face thereof along an edge of the pocket and a second squeezing frame profile section on said second frame at a face thereof juxtaposed with said first squeezing frame profile section in said closed position for squeezing edges of dough layers together along said pocket, said squeezing frame profile sections and said ribs defining opposing separating edges subdividing said pockets from said layers.

2. The device defined in claim 1 wherein said squeezing frame profile sections define between them a gap in said closed position which in a first region has a width corresponding generally to twice a thickness of one of said dough layers, said width decreasing in a second region outwardly of said first region to zero, said opposing edges lying in a third region outwardly of said second region.

3. The device defined in claim 2 wherein said width decreases monotonically in said second region.

4. The device defined in claim 2 wherein a width of said first region is between one-half and four times the thickness of said one of said dough layers.

5. The device defined in claim 4 wherein said width of said first region is between one and two times the thickness of said one of said dough layers.

6. The device defined in claim 2 wherein said first frame is provided in a first shell, said second frame is provided in a second shell and said shells are connected together by a hinge along juxtaposed edges of said shells.

7. The device defined in claim 6 wherein said frames are reversibly detachable from said shells.

8. The device defined in claim 6, further comprising at least one detent element for the first and/or second frame or the first and/or second shell.

9. The device defined in claim 6 wherein said hinge is provided between said first and second frames or between said first and second shells.

10. The device defined in claim 9 wherein said hinge is separable.

11. The device defined in claim 6 wherein at least one of said squeezing frame profile sections has an at least partially closed face juxtaposed with the other of said squeezing frame profile sections.

12. The device defined in claim 6 wherein said squeezing frame profile sections have juxtaposed mutually interdigitating toothed surfaces.

13. The device defined in claim 6 wherein the device is formed on an underside thereof with a slip-resistant element.

14. The device defined in claim 1 wherein at least one of said frames, at least one of said shells, at least one of said ribs, and said hinge are composed of at least one material selected from the group which consists of plastic, metal, a metal alloy and wood.

15. The device defined in claim 1 wherein one of said squeezing frame profile sections is formed from a material different from other parts of the respective frame or from the other frame.

\* \* \* \* \*